United States Patent [19]

Lim

[11] 4,066,569
[45] Jan. 3, 1978

[54] DOPANTS FOR DYNAMIC SCATTERING LIQUID CRYSTALS

[75] Inventor: Hong Sup Lim, Agoura, Calif.

[73] Assignee: Hughes Aircraft Company, Culver City, Calif.

[21] Appl. No.: 645,155

[22] Filed: Dec. 30, 1975

[51] Int. Cl.² ........................... C09K 3/34; G02F 1/13
[52] U.S. Cl. ..................................... 252/299; 252/408; 252/500; 252/519; 260/429 CY; 260/439 CY; 260/465 H; 350/160 LC
[58] Field of Search ............... 252/299, 408, 500, 519; 260/439 CY, 465 H; 350/160 LC

[56] References Cited

U.S. PATENT DOCUMENTS

| | | | |
|---|---|---|---|
| 3,162,641 | 12/1974 | Acker et al. | 252/500 |
| 3,814,700 | 6/1974 | Aviram et al. | 252/408 LC |
| 3,838,059 | 9/1974 | Wong | 252/299 |
| 3,876,286 | 4/1975 | Deutscher et al. | 252/299 |
| 3,923,857 | 12/1975 | Doller et al. | 252/299 |
| 3,932,298 | 1/1976 | Labes | 252/299 |
| 3,975,285 | 8/1976 | Ohnishi et al. | 252/299 |
| 3,990,984 | 11/1976 | Barret et al. | 252/299 |

FOREIGN PATENT DOCUMENTS 4,995,881  9/1974  Japan ..................... 252/299

OTHER PUBLICATIONS

Ohnishi; Y., et al., Appl. Phys. Lett., vol. 24, No. 5, pp. 213-216 (Mar. 1974).
Baise; A. I., et al., Appl. Phys. Lett., vol. 21, No. 4, pp. 142-143 (Aug. 1972).
Foster; R., Organic Charge-Transfer Complexes, Academic Press, N. Y., pp. 1-12, 230-249, 284-288 (1969).
Mukherjee; J., et al., J. Org. Chem., vol. 30, pp. 644-646 (1965).
Brandon; R. L., et al., J. Org. Chem., vol. 31, pp. 1214-1217 (Apr. 1966).

Primary Examiner—Benjamin R. Padgett
Assistant Examiner—T. S. Gron
Attorney, Agent, or Firm—B. T. Hogan, Jr.; W. H. MacAllister

[57] ABSTRACT

Metallocenes when mixed with conjugated cyanoorganic compounds such as 7,7'8,8'-tetracyanoquinodimethane (TCNQ) and (2,4,7,-trinitro-9-fluorenylidene)-malononitrile (TFM) function as excellent dopants for liquid crystals.

9 Claims, No Drawings

DOPANTS FOR DYNAMIC SCATTERING LIQUID CRYSTALS

BACKGROUND OF THE INVENTION

1. Field of the Invention

This invention is related to the field of Liquid Crystals (LC) in general and to the use of dopants to alter the properties of nematic LC for dynamic scattering electro-optic displays and LC containing a mixture of cholesteric and nematic material for storage scattering displays in particular.

2. Prior Art

Nematic LC and the cholesteric-nematic LC mixtures have found widespread usage in electro-optic displays such as alphanumeric displays for calculators; watches; panel meters, etc.; matrix displays; and light valves for various applications. In those applications where dc-dynamic scattering mode (DSM) is involved, prior art LC and LC mixtures have been limited by stability and scattering characteristic problems.

In seeking to overcome the scattering characteristic problems, various dopants have been added to the LC or LC mixtures. Consequently some of the scattering characteristics were improved significantly but lifetime remained as the limiting problem.

A. I. Baise et al. disclosed charge-transfer complexes as effective dopants for lowering the threshold voltage of azoxybenzene derivatives (a nematic LC) in *Applied Physics Letters*, Vol. 21, No. 4, p. 142 (1974). However, there was no evidence of an improvement in the lifetime of the LC for DSM display applications or of an improvement in the response characteristics of the doped materials.

The closest prior art known by the inventor hereof is in the publication by Yoshitake Ohnishi et al. entitled "Properties of Nematic Liquid Crystals Doped with Hydroquinone and p-Benzoquinone: Long-Term Dynamic Scattering Under dc Excitations" *Applied Physics Letters*, Vol. 24, No. 5, p. 213 (1974). In this publication the authors teach that mixtures of charge-transfer complex compounds function as dopants. However, the compounds selected by the authors are well known as weak charge-transfer complexes. Consequently, they do not undergo complete reversible electrochemical oxidation and tend to promote poor dynamic scattering efficiencies at typical operating current levels. In addition, it was disclosed by Ohnishi et al that nematic liquid crystals doped with their complexes show significant evidence of degradation within 10,000 hours at an 18 volt dc excitation level.

There are no LC or LC mixtures containing prior art dopants which have lifetimes greater than 10,000 hours and exhibit good dynamic scattering characteristics with low threshold voltages known to the inventor hereof.

THE INVENTION

SUMMARY

It is the object of this invention to provide dopants for liquid crystals which alter the electrochemical characteristics of the crystals by increasing the lifetime of said liquid crystals, increasing the dynamic scattering efficiency of said liquid crystals, lowering the threshold voltage of said liquid crystals and improving the response characteristics of said liquid crystals while avoiding the disadvantages of known prior art dopants.

In meeting the afore-stated objectives, dopants have been formulated from mixtures of metallocenes and cyano-organic compounds which may be added to nematic liquid crystals (NLC), nematic liquid crystal mixtures, and cholesteric-nematic liquid crystal (CNLC) mixtures.

Metallocenes found to be useful were ferrocenes. Ruthenocenes may also be useful. Conjugated cyano-organic compounds found to be useful were 7,7'8,8'-tetracyanoquinodimethane (TCNQ) and (2,4,7,-trinitro-9-fluorenylidene)-malononitrile (TFM).

Various mixtures of these compounds in amounts ranging from approximately 0.01 to 1% of the weight of the LC or LC mixture were found to be effective.

Detailed Description of the Invention

Selected redox dopants have been found to be useful in improving the lifetime, threshold, and scattering characteristics of the dc dynamic scattering mode (DSM) of liquid crystals and liquid crystal mixtures. These dopants are selected to react preferentially and reversibly at the electrodes; thus they carry the current necessary for the dc-DSM effects. Low threshold voltages ($\approx$2V), high scattering efficiency (98% at 20V), and long dc-DSM lifetimes (up to 17,000 hours) are obtained with liquid crystals containing a redox dopant pair consisting of a substitutent ferrocene and a conjugated cyano-organic compound using a test cell which is made by sandwiching the LC mixture between two indium tin oxide electrodes which are separated by 13 $\mu$m by a mylar spacer.

Redox dopants are defined as a combination of donors (D) and acceptors (A) that readily undergo reversible electrochemical reactions, and which do so at lower voltages than the electrochemical reactions of the LC components. The redox dopants are thus designed to carry the dc current in LC cells. A redox dopant, in other words, is a mixture of two different types of charge-transfer complex similar to those described by Y. Ohnishi et al. (Supra).

A four-component ester LC designated as HRL-2N10 was used in the present study. HRL-2N10 is comprised of a mixture of p-butylphenyl p-toluate, p-butoxyphenyl p-butoxybenzoate, p-butoxyphenyl p-hexyloxybenzoate and p-butoxyphenyl p-octyloxybenzoate in a weight ratio of 15: 5: 9: 9, respectively. HRL-2N10 has a neumatic range of about 18° to 55°, a negative dielectric anisotropy of $\epsilon_a = -0.12$ (25° C, 500 Hz) and a birefringence of $\Delta n = 0.16$ (25°, 545 nm). As with other purified nematics, this LC in the undoped state has a high resistivity ($p_\perp = 3.8 \times 10^{11}$ ohm-cm at 100 Hz) and does not show any DSM effects until conductive dopants are added. Other LC and LC mixtures may be used.

LC compounds doped with the redox dopants of the invention, when compared to LC compounds doped with conventional salt-type dopants, show substantial improvement in their electrochemical characteristics. Salt-type dopants are defined as electrochemically inactive ionic compounds.

The invention's redox dopants show low dc-DSM thresholds (2.0 and 2.1 V) compared to the same LC with the salt dopant ($V_{th} = 3$ and 5 V). The redox dopants give a much higher scattering level at a given applied voltage, which is an important consideration in display devices where limited driving voltages are available.

Long dc-DSM lifetimes with good scattering levels and relatively stable current density are obtained with the LC containing redox dopants.

Generally the redox dopants may be formed from mixtures of metallocenes, which function as donors, and conjugated cyano-organic compounds, which function as acceptors, dissolved in the liquid crystal or liquid crystal mixture host compounds.

Metallocenes found to be useful include the metals of Group VIII of the periodic chart which consist of Fe, Ru, and Os. They may be metallocenes or substituted metallocenes. The monobutyl- and dibutyl-substituted ferrocenes appear to yield the best results. The substitutents may be any organic group which would not change the electrochemical properties of the metallocenes drastically. Examples of such substitutents may be alkyl, alkoxy, ester, etc.

Suitable acceptor compounds include but are not limited to (2,4,7-trinitro-9-fluorenylidene) malononitrile (TFM) and 7,7',8,8'-tetracyanoquinodimethane (TCNQ). Of these two compounds, mixtures utilizing TFM as the acceptor appear to yield the best results.

Tests have shown that the conductivity of the doped LC or LC mixture is dependant upon the concentration of the dopant employed. The maximum dopant-LC or dopant-LC mixture ratio is fixed by the solubility characteristics of the dopant in the LC or LC mixture. For all practical purposes no more than 1% of the dopant is required.

Dopant mixtures of donor compounds and acceptor compounds in ratios ranging from 0.1 to 10 may be useful. The preferred ratio of the donor and acceptor compound, however, is equimolar. The key is to provide a mixture where $A + e^- = A^-$ and $D^+ + e^- = D$ is formed at the negative electrode of the LC cell while $D = D^+ + ^-$ and $A^- = A + e^-$ is formed at the positive electrode of the cell. This electorchemical reversibility is believed to be responsible for long dc-DSM operating lifetimes of the doped LC or LC mixtures.

EXAMPLE I 100g of HRL2N10 is mixed with 0.5g of TFM and 0.5g of dibutylferrocene (DBF), and heated to approximately 60° C with slight stirring. The resulting mixture exhibits a scattering efficiency of 98%, a threshold voltage of $\approx 2V$, a turn on time of $\approx 40$ ms, a turn off time of $\approx 600$ ms, and a lifetime of $>17,000$ hours when tested in an LC cell at a 20Vdc excitation level. The test cells were made by sandwiching the LC mixture between two indium tin oxide electrodes with a 13 μm spacer.

EXAMPLE II 100g of HRL2N10 mixed with 0.05g of TFM and 0.5g of DBF is heated to $\approx 60°$ C with slight stirring to form a solution. The resulting mixture exhibits a scattering efficiency of 98%, a threshold voltage of $\approx 2V$, a turn on time of $\approx 40$ ms, a turn off time of $\approx 600$ ms, and a lifetime of $>13,000$ hours when tested in an LC cell at a 20Vdc excitation level. The cell was made in a way similar to that used in Example I.

What I claim is:

1. A doped liquid crystal combination suitable for dc DSM and storage scattering applications comprised of a metallocene formed from a metal selected from the group consisting of Fe, Ru, and Os and (2,4,7-trinitro-9-fluorenylidene)-malononitrile dissolved in a nematic liquid crystal, nematic liquid crystal mixture, or cholesteric-nematic liquid crystal mixture.

2. The combination of claim 1 wherein said metallocene is taken from the group of compounds consisting of ferrocene and substituted ferrocenes.

3. The combination of claim 1 wherein said metallocene is ferrocene.

4. The combination of claim 1 wherein said metallocene is a mono-substituted ferrocene whose general structural formula is

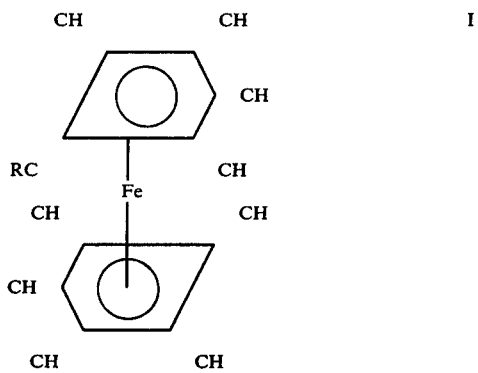

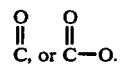

and R is an organic group of the formula $C_nH_{2n+1}X$ where $n$ ranges from 1 to 20 and X may be $CH_2$, O, $$\overset{O}{\underset{\|}{C}}, \text{ or } \overset{O}{\underset{\|}{C}}-O.$$

5. The combination of claim 1 wherein said metallocene is a di-substituted ferrocene whose general structural formula is

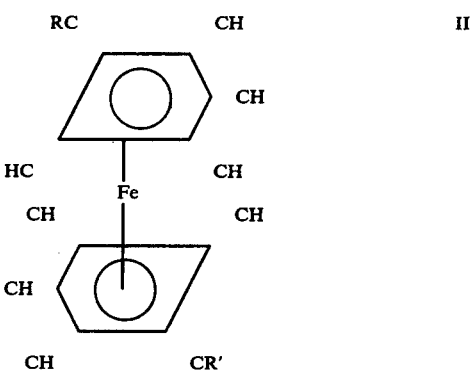

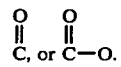

and both R' and R are organic groups of the formula $C_nH_{2n+1}X$ where $n$ ranges from 1 to 20 and X may be $CH_2$, O, $$\overset{O}{\underset{\|}{C}}, \text{ or } \overset{O}{\underset{\|}{C}}-O.$$

6. The combination of claim 4 wherein said ferrocene is n-butyl-ferrocene.

7. The combination of claim 5 wherein said ferrocene is di-n-butyl-ferrocene.

8. The combination of claim 1 wherein said dopant is dissolved in a nematic liquid crystal or a mixture of liquid crystals taken from the group of compounds consisting of phenyl benzoate esters.

9. The combination of claim 1 wherein the concentration of said dopant is less than 1% of the weight of said nematic liquid crystal, nematic crystal mixture, or cholesteric-nematic liquid crystal mixture.

* * * * *